(12) United States Patent
Ngan et al.

(10) Patent No.: US 8,548,065 B2
(45) Date of Patent: Oct. 1, 2013

(54) PARAMETRIC INTERPOLATION FILTER FOR MOTION-COMPENSATED PREDICTION

(75) Inventors: King Ngi Ngan, Sha Tin (CN); Jie Dong, Fanling (CN)

(73) Assignee: The Chinese University of Hong Kong, Hong Kong (CN)

( * ) Notice: Subject to any disclaimer, the term of this patent is extended or adjusted under 35 U.S.C. 154(b) by 415 days.

(21) Appl. No.: 12/899,768

(22) Filed: Oct. 7, 2010

(65) Prior Publication Data

US 2011/0096236 A1 Apr. 28, 2011

Related U.S. Application Data

(60) Provisional application No. 61/254,004, filed on Oct. 22, 2009.

(51) Int. Cl.
*H04N 7/18* (2006.01)
(52) U.S. Cl.
USPC .................................................. 375/240.29
(58) Field of Classification Search
USPC ....................................... 375/240.01–240.29
See application file for complete search history.

(56) References Cited

U.S. PATENT DOCUMENTS 5,706,055 A * 1/1998 Katto ..................... 348/409.1
2008/0175322 A1 7/2008 Lee et al.
2010/0150475 A1 * 6/2010 Holland ...................... 382/300

FOREIGN PATENT DOCUMENTS

KR 20070073462 A 7/2007

OTHER PUBLICATIONS

Wedi, T. "Adaptive interpolation filter for motion compensated prediction," Image Processing. 2002. Proceedings. 2002 International Conference on , vol. 2, No., pp. II-509-II-512 vol. 2, 2002,.*
Tay et al. (Flexible Design of Perfect Reconstruction FIR Diamond Subband Filters with Transformations Proc. SPIE 1818, Visual Communications and Image Processing '92, 30 (Nov. 1, 1992).*
Lanczos Resampling; Feb 1, 2009, Wikipedia, http://web.archive.org/web/20090201070726/http://en.wikipedia.org/wiki/Lanczos_resampling.*
Window Function; Dec. 11, 2008, Wikipedia <http://web.archive.org/web/20081211100103/http://en.wikipedia.org/wiki/Window_function>.*
International Search Report and Written Opinion corresponding to the PCT application No. PCT/CN2010/077942, date of mailing Jan. 27, 2011, 10 pages total.

* cited by examiner

*Primary Examiner* — Andy Rao
(74) *Attorney, Agent, or Firm* — Kilpatrick Townsend & Stockton LLP; Kenneth R. Allen

(57) ABSTRACT

In a motion compensated prediction process, a parametric interpolation filter (PIF) device is provided that takes into account the time-variant statistics of video sources, the filter being represented by a model determined by five parameters instead of by individual coefficients. The parameters are calculated and coded on a frame-by-frame basis to minimize the energy of the prediction error for each frame. The model design is based on the fact that high frequency energy of an HD video source is mainly distributed along the vertical and horizontal directions of a frame. A PIF device with the method according to the invention overcomes this obstacle because it represents each filter using only five parameters, all of which are encoded using sufficiently high precision without substantially increasing overhead.

19 Claims, 2 Drawing Sheets

PARAMETRIC INTERPOLATION FILTER FOR MOTION-COMPENSATED PREDICTION

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to digital video and more particularly to coding efficiency of high definition (HD) video data.

Motion compensated prediction (MCP) is the key to the success of modern video coding standards. With MCP, the video signal to be coded is predicted from the temporally neighboring signals, and only the prediction error and the motion vector (MV) are transmitted. However, due to the finite sampling rate, the actual position of the prediction in the neighboring frames may be out of the sampling grid, where the intensity is unknown, so the intensities of the positions between the integer pixels, called sub-positions, must be interpolated and the resolution of the MV must be increased accordingly. In the existing video coding standards, the interpolation filter is designed to fit the general statistics of various video sources, so the filter coefficients are fixed.

In prior work, adaptive interpolation filter (AIF) techniques have been used wherein the coefficients are analytically calculated for each frame using a linear minimum mean squared error (LMMSE) estimator. However, AIF techniques code the filter coefficients individually, and therefore trade-offs between the accuracy of coefficients and the size of side information must be made. These two conflicting aspects are the major obstacles to improving the performance, as inaccurate coefficients greatly degrade the performance of the interpolation filter.

Due to higher data rates associated with HD video coding, there is a need to improve the coding efficiency of HD video.

SUMMARY OF THE INVENTION

According to the invention, in a motion compensated prediction process, a parametric interpolation filter (PIF) is provided that takes into account the time-variant statistics of video sources, the filter being represented by a model determined by multiple parameters instead of by individual coefficients and has a diamond shaped passband with peaks in the horizontal direction and the vertical direction such that high frequency components in the horizontal direction and in the vertical direction are not filtered out. The parameters are calculated and coded on a frame-by-frame basis to minimize the energy of the prediction error for each frame. The model design is based on the fact that high frequency energy of a high definition (HD) video source is mainly distributed along the vertical and horizontal directions of a frame. A PIF device operative with the underlying method according to the invention overcomes this obstacle because it represents each filter using only a limited number of parameters (five), all of which are encoded using sufficiently high precision without substantially increasing overhead.

Experimental results show that PIF techniques significantly outperform the known adaptive interpolation filter (AIF) techniques. While the invention is primarily suited to improve motion compensated prediction of HD video formats, other video formats may benefit as well.

The invention will be better understood by reference to the following detailed description in connection with the accompanying drawings.

DETAILED DESCRIPTION OF THE INVENTION

A parametric interpolation filter (PIF) has three features. First, in order to keep track of the time-variant statistics, the interpolation filter is optimized for each frame such that the energy of prediction error for each frame is minimized. Second, as the name implies, PIF represents the interpolation filters by a function determined by parameters, in this instance five parameters. The parameters are transmitted in the frame header with very high precision, but the overhead size remains small. Third, the function is designed for HD video coding based on the fact that high frequency energies of HD videos are mainly distributed in the vertical and horizontal directions. Without the loss of generality, the following description assume ¼-pixel motion-compensated prediction (MCP) and each sub-position is supported by the surrounding 6×6 integer pixels. The case can be easily extended to other resolution MCP and other support regions.

A. Optimal AIF Design

Figure 1:
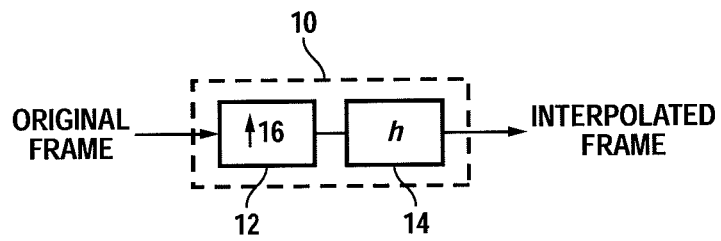
FIG. 1 is a block diagram of the interpolation process of an adaptive interpolation filter, including a parametric interpolation filter h, wherein the frame is interpolated to four times horizontal and four times vertical directions.

It is helpful to understand the coding process in the context of adaptive interpolation filter (AIF) design to appreciate the invention. As indicated by FIG. 1, the interpolation process of the optimal filter 10 comprises two steps: upsampling 12, which comprises upsampling the original reference frame to 16 times the size to increase spatial resolution of the motion vector and interpolated at 16 times size for motion compensated prediction (MCP) by inserting zero-valued samples in the half-pixel and quarter-pixel sampling grids. This, however, produces undesired spectra in the frequency domain, Therefore, the undesired spectra are removed by a low pass filter h 14. As explained hereafter, filter h 14 may be a parametric interpolation filter $h_f$ according to the invention. The optimal h, denoted as $h_{opt}$, achieving the minimum prediction error energy, can be obtained by using a linear minimum mean square error (LMMSE) estimator. The size of h in FIG. 1 is 23×23. As hereinafter explained, the parametric interpolation filter $h_f$ according to the invention provides a good approximation of the optimal filter $h_{opt}$, but with considerably fewer computations 1) Optimal AIF for P-Frames Let P and S be the reference frame and the current frame, respectively. Upsampling P and S by a factor 16 using zero-insertion and zero-order holding, respectively, we get $P_{16}$ and $S_{16}$. Note $P_{16}$ is where h in FIG. 1 applies. Then the prediction error energy is given by (1):

$$\sigma_e^2 = E\left[\left(\sum_{i=-11}^{11}\sum_{j=-11}^{11} h(i,j)P_{16}(x-i+d_x, y-j+d_y) - S_{16}(x,y)\right)^2\right] \quad (1)$$

where (x,y) indicates the spatial coordinate and $(d_x,d_y)$ includes the two components of the MV, which has quarter-pixel resolution. Letting $\partial\sigma_e^2/\partial h(m,n)$ equal 0, one can derive the minimum $\sigma_e^2$ and the optimal interpolation filter $h_{opt}$; the solution converges to the Wiener-Hopf equations as in (2), $$\sum_{i=-11}^{11}\sum_{j=-11}^{11} h(i,j)R_{pp}(i-m, j-n) = R_{ps}(m,n), \quad (2)$$

$$\forall m,n, \quad -11 \le m, n \le 11$$

where $R_{pp}$ and $R_{ps}$ represent the autocorrelation of $P_{16}$ and the motion-compensated cross-correlation of $P_{16}$ and $S_{16}$, respectively. $R_{pp}$ and $R_{ps}$ are calculated with all the MVs for the current frame known; therefore, motion estimation (ME) is performed before starting coding the current frame. Since the LMMSE estimator is commonly used in statistics and signal processing, the detailed reasoning steps are skipped here.

2) Optimal AIF for B-Frames

For B-frames, forward, backward, and bi-directional MCPs are allowed, where the former two can follow the above solution to derive the optimal AIF. For bi-directional MCP, the solution is modified. Denoting $P_{16,f}$ and $(d_{x,f},d_{y,f})$ as the upsampled reference frame and MV for forward MCP, respectively, and $P_{16,b}$ and $(d_{x,b},d_{y,b})$ for the backward case, one should re-write (1) to (3).

$$\sigma_e^2 = E\left[\left(\frac{1}{2}\sum_{i=-11}^{11}\sum_{j=-11}^{11} h(i,j)\binom{P_{16,f}(x-i+d_{x,f}, y-j+d_{y,f})+}{P_{16,b}(x-i+d_{x,b}, y-j+d_{y,b})} - S_{16}(x,y)\right)^2\right] \quad (3)$$

Similarly, letting $\partial\sigma_e^2/\partial h(m,n)$ equal 0, one finally derives $h_{opt}$ by (4) and obtains the minimum $\sigma_e^2$.

$$0 = \frac{\partial\sigma_e^2}{\partial h(m,n)} \Rightarrow \sum_{i=-11}^{11}\sum_{j=-11}^{11} h(i,j) \quad (4)$$

$$\left[\frac{1}{2}R_{ff}(i-m,j-n) + \frac{1}{2}R_{bb}(i-m,j-n) + R_{fb}(i-m,j-n)\right]$$

$$= R_{fs}(m,n) + R_{bs}(m,n), \quad \forall m,n, \quad -11 \le m, n \le -11$$

In (4), $R_{ff}$ and $R_{bb}$ represent the autocorrelations of the forward and backward upsampled reference frames, $P_{16,f}$ and $P_{16,b}$, respectively, and $R_{fb}$, $R_{fs}$, and $R_{bs}$ are the motion-compensated cross-correlations of $P_{16,f}$ and $P_{16,b}$, $P_{16,f}$ and $S_{16}$, and $P_{16,b}$ and $S_{16}$, respectively.

B. Approximation Effects

If no symmetry constraint and quantization are imposed, the optimal AIF has $23^2$ different real-valued coefficients. This number of coefficients makes it too expensive to be coded for each frame. The prior art teaches of an effort to reduce the side information representing AIF, including restricting the support region, imposing the symmetry constraints, and quantizing the coefficients, which lead to an approximation of $h_{opt}$, denoted as $\tilde{h}$, and larger prediction error compared with that produced by $h_{opt}$. The difference between $h_{opt}$ and $\tilde{h}$ is denoted as $h_\Delta$, equal to $h_{opt}-\tilde{h}$, and the increased energy of prediction error introduced by $h_{66}$, is given in (5).

$$\Delta err = \sigma_e^2|_{\tilde{h}} - \sigma_e^2|_{h_{opt}} \quad (5)$$

$$= \sum_{i,j}\sum_{m,n} h_\Delta(i,j)h_\Delta(m,n)R_{pp}(i-m, j-n)$$

C. Function Representation of Interpolation Filters

According to the invention, the impulse response of interpolation filters is represented by a function $h_f$ determined by five parameters, and the filter coefficients are calculated as the function values. The five parameters should make the resulting $h_f$ approximate $h_{opt}$ such that $\Delta err$ in (5) is minimized. Obviously, the side information for coding five parameters is very small. Yet the accuracy of the coefficients can also be guaranteed if the parameters are quantized with enough precision.

Let $F(e^{j\omega_x},e^{j\omega_y})$ be the Fourier transform of the reference frame P. After upsampling P using zero-insertion, shown in FIG. 1 as element 12, the Fourier transform of the upsampled frame $P_{16}$, denoted as $F_{16}(e^{j\omega_x},e^{j\omega_y})$, is given by (6):

$$F_{16}(e^{j\omega_x},e^{j\omega_y}) = F(e^{j4\omega_x},e^{j4\omega_y}) \quad (6)$$

Figure 2A:
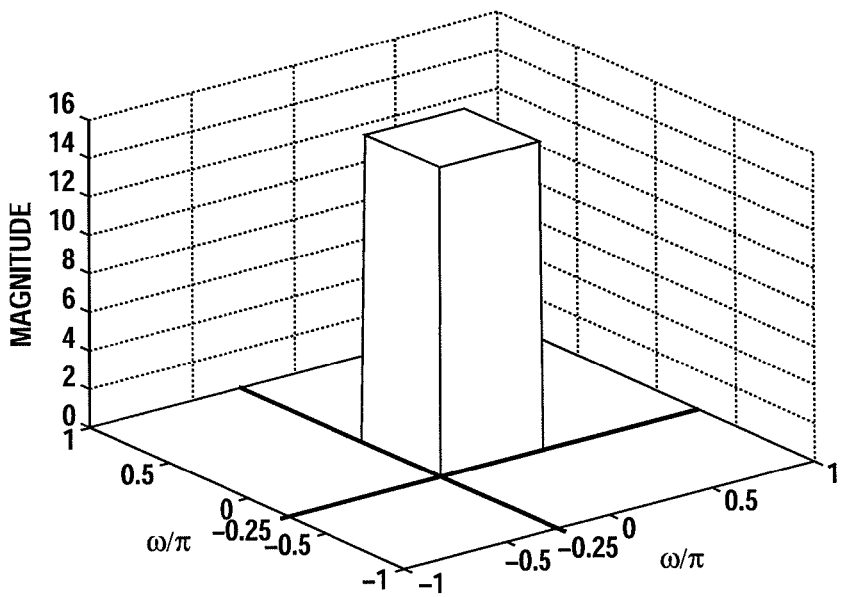
FIG. 2(a) is a three-dimensional graph of the frequency response of an ideal interpolation filter h of FIG. 1.

According to (6), $F_{16}$ is a frequency-scaled version of F. In $F_{16}$, the undesired spectra centering at integer multiples of $(\pi/2,\pi/2)$, i.e., the original sampling rate, are introduced by the zero-insertion upsampling and should be removed. This requires a low pass filter h 14 (see FIG. 1) with a gain of 16 and a cutoff frequency. The ideal frequency response is shown in FIG. 2(a). The interpolation filter with such a frequency response can preserve all the information in F.

According to the invention, a PIF is provided where the frequency response of $h_f$ is based on the special energy distribution of HD videos in the frequency domain, compared with low resolution videos. A random field in the frequency domain is represented by power spectral density (PSD), denoted as $S_{pp}(\omega_x,\omega_y)$ which by definition is the Fourier transform of the autocorrelaiton. In practice, autocorrelation is an estimate based on a set of videos. Applying Fourier transform to the estimated autocorrelation produces an estimated PSD, which may not be consistent. Here, PSD is estimated by the periodgram of the random field, as given in (7).

$$\hat{S}_{pp}(\omega_x,\omega_y) = \frac{1}{MN}|F(\omega_x,\omega_y)|^2 \quad (7)$$

$$= \frac{1}{MN}\left|\sum_{m=0}^{M-1}\sum_{n=0}^{N-1} P(m,n)e^{-j\omega_x m - j\omega_y n}\right|^2$$

To achieve a more accurate result, each video sequence, taken as a realization of a random field, has 30 frames involved whose periodograms are averaged to produce the estimated PSD. Two differences on PSD between HD and CIF sequences can be observed. First, the low frequency energy in CIF sequences is smaller then that in HD sequences. Second, the high frequency energies in HD sequences are mainly distributed in the horizontal and vertical directions, whereas the high frequency energies in CIF sequences are distributed in arbitrary directions.

Figure 2B:
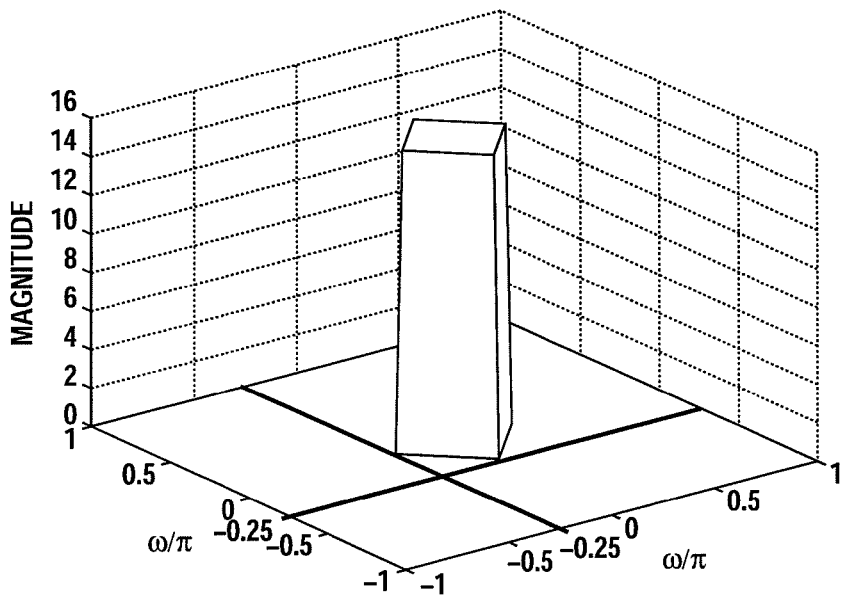
FIG. 2(b) is a three-dimensional graph of the frequency response of an ideal interpolation filter $h_f$ of the type of FIG. 1 according to the invention having a diamond-shaped passband in accordance with the invention.

Considering the special PSD of HD videos, the desired filter according to the invention has a diamond-shaped passband (see FIG. 2(b)), such that high frequency components neither in the horizontal direction nor in the vertical direction are filtered out. There are two reasons for proposing the filter with such a passband. First, interpolation in the context of video coding is for a better MCP, and the high frequency components are more likely to introduce large prediction error, thus exerting negative influence on MCP. Second, high frequency components outside the diamond-shaped passband have very low energy and contribute little to the content of the frame. This passband shape also accords with the observation on a number of optimal AIFs.

Figure 3:
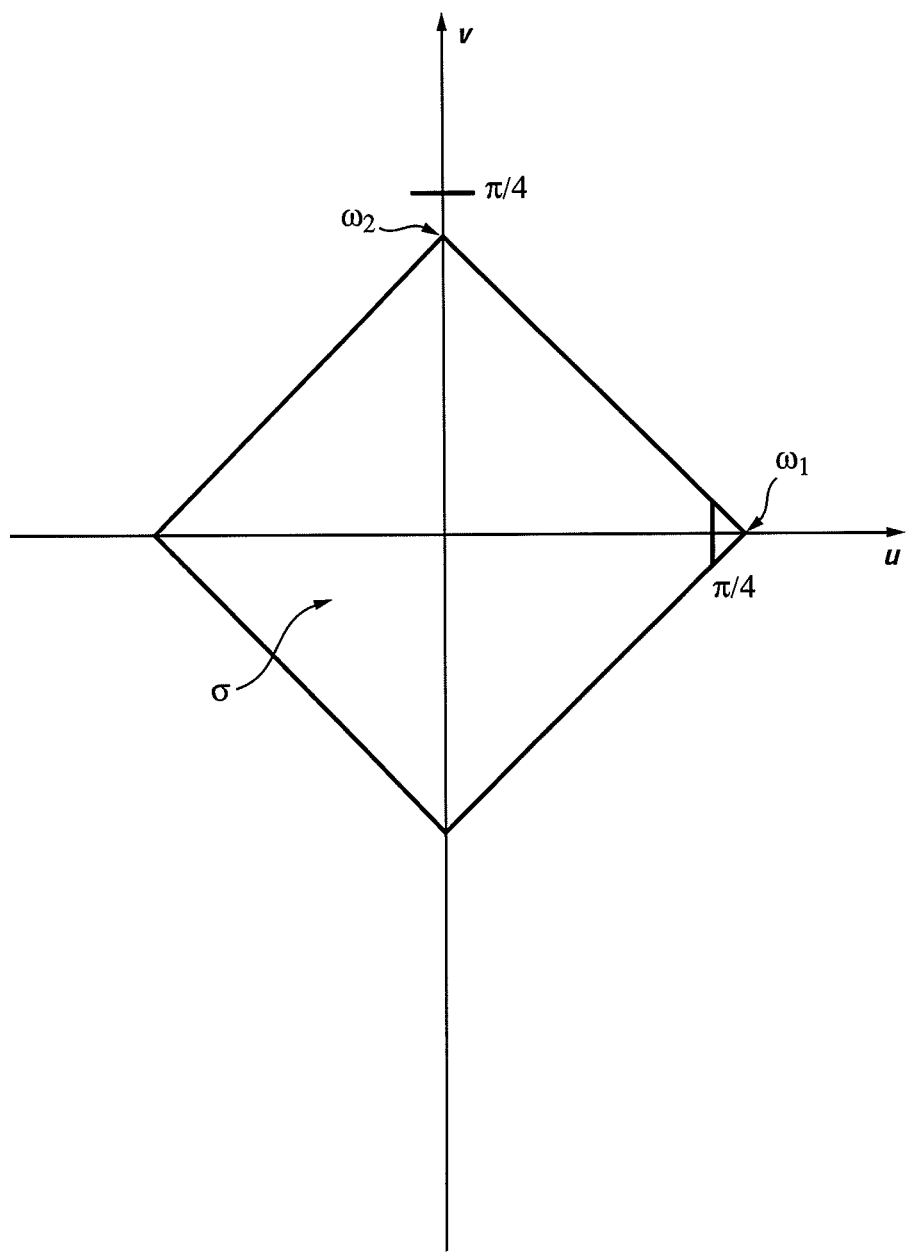
FIG. 3 is a two-dimensional graphical representation of the passband of a parametric interpolation filter $h_f$ according to the invention.

Theoretically, the cutoff frequency should be $\pi/4$, such as the one in FIG. 2(b), although, in practice, they may vary around $\pi/4$. As shown in FIG. 3, two parameters, $\omega_1$ and $\omega_2$, are used to denote the cutoff frequencies at two axes and the shaded diamond-shaped area $\sigma$ represents the passband. The corresponding impulse response $h_d$ can be obtained by inverse Fourier transform, as expressed in (8), $$h_d(m, n) = \frac{1}{4\pi^2} \int_{[-\pi,\pi]^2} H_d(e^{ju}, e^{jv}) e^{jmu+jnv} du dv \quad (8)$$

where $H_d$ is given as below.

$$H_d(e^{ju}, e^{jv}) = \begin{cases} 16, & \text{if } (u, v) \in \sigma \\ 0, & \text{otherwise} \end{cases} \quad (9)$$

Substituting (9) into (8), one can finally find the formula of $h_d$ as shown in (10):

$$h_d(m, n) = \frac{8\omega_1\omega_2}{\pi^2} \text{Sinc}\left(\frac{\omega_1 m + \omega_2 n}{2}\right) \text{Sinc}\left(\frac{\omega_1 m - \omega_2 n}{2}\right), \quad (10)$$
$$-\infty < m, n < \infty$$

where function Sinc(.) is defined as follows:

$$\text{Sinc}(x) = \begin{cases} \frac{\sin(x)}{x}, & \text{if } x \neq 0 \\ 1, & \text{otherwise} \end{cases} \quad (11)$$

The filter function $h_d$ as noted in Equation (10) is infinite, so it must be truncated by an appropriate window function w before used for interpolation. If the filter is simply truncated by limiting the range of m, n to [−11, 11], deleterious effects occur that degrade the performance. According to this invention, w is defined in (12), using three limiting parameters a, b and c. This function for w in m and n is empirically better than other widely used functions, such as rectangular, triangular, Harming, and Blackman window functions.

$$w(m, n) = \begin{cases} a + \text{Sinc}(b|m| + c|n|), & \text{if } -11 \leq m, n \leq 11 \\ 0, & \text{otherwise} \end{cases} \quad (12)$$

Parameter a specifies the DC level of w. Parameters b and c specify the shape. Small b and c values lead to a flat shape, whereas large b and c values lead to a sharp shape. The approximation of the desired filter, denoted as $h_f$, is obtained as the product of $h_d$ and w, herein written out as.

$$h_f(m, n) = \quad (13)$$
$$\begin{cases} N\text{Sinc}\left(\frac{\omega_1 m + \omega_2 n}{2}\right)\text{Sinc}\left(\frac{\omega_1 m - \omega_2 n}{2}\right)(a + \text{Sinc}(b|m| + c|n|)), \\ \text{if } -11 \leq m, n \leq 11 \\ 0, \text{otherwise} \end{cases}$$

Therefore, $h_f$ is determined by a five-parameter set, $x=\{\omega_1, \omega_2, a, b, c\}$. The factor N guarantees the filter gain is 16. According to the invention, an interpolation filter $h_f$ is defined and completely specified by Equation 13. Since this represents filtering by parameters rather than by individual coefficients, it therefore is named a parametric interpolation filter (PIF).

D. Parameter Determination and Coding

As the faun of $h_f$ has been given in (13), the parameter set x has to be determined for each frame and coded. The optimal x should make $h_f$ reduce as much prediction error as $h_{opt}$ can, by achieving the minimum of $\Delta$err in (5), i.e., $$\hat{x} = \arg\min_{x} \Delta err \quad (14)$$

where $h_\Delta$ in (5) can be expressed as in (15)

$$h_\Delta(i,j) = h_{opt}(i,j) - h_f(i,j|x), -11 \leq i,j \leq 11 \quad (15)$$

The minimum is achieved by using a quasi-Newton method, which is based on Newton's method to find the stationary point of the objective function, where the gradient is zero. Different from Newton's method, which uses the first and second derivatives, i.e., gradient and Hessian, to find the stationary point, the quasi-Newton method does not directly compute the Hessian matrix of the objective function. Instead, it updates the Hessian matrix by analyzing successive gradient vectors. Here, the BFGS algorithm is used for the quasi-Newton method to update the Hessian matrix. The Broyden-Fletcher-Goldfarb-Shanno algorithm is a known quasi-Newton optimization method f The detailed description is omitted here, as this method is known and not a part of the contribution in this invention.

Since this numerical method solves local minimum problems, the initial estimate of (the vector) x becomes critical. At the beginning of the coding of a video sequence, the initial estimates of $\omega_1$ and $\omega_2$ are both $\pi/4$, and empirical initial values 0.1, 0.15, and 0.15 are assigned to a, b, and c, respectively. During the coding process, the initial estimate keeps updated by the value of the estimate $\hat{x}$ of the latest P-frame using PIF mode.

As the BFGS method is for unconstrained optimization, the solution x will theoretically have any real numbers. However, the values of $\omega_1$ and $\omega_2$ are expected to be around $\pi/4$ and the valid range is [0,π]. The values of a, b, and c are around zero. Therefore, in case any of $\omega_1$ and $\omega_2$ is larger than π or any of a, b, and c has the absolute value larger than 1, the solution is discarded, and consequently the PIF mode in the current frame is disabled. However, based on experiments, such case has never occurred and is therefore not expected to occur. The magnitude of each parameter is uniformly quantized to 8196 steps, coded by 13-bit fixed length coding (FLC). To indicate the signs of a, b, and c, three additional bits are used. Hence, the side information is exactly 68 bits for each frame.

In summary, according to the invention, an interpolation filter for sampled video signal processing to reduce prediction error is provided having a diamond-shaped transfer function h as given by equation 13 optimized by five parameters as given in equation 13 as two cutoff frequencies and three filter function limiting parameters each calculated over a limited parametric range for each video frame.

The invention has been explained with reference to specific embodiments. Other embodiments and implementations of the invention will be evident to those of ordinary skill in the art. It is therefore not intended that the invention be limited, except as indicated by appended claims.

What is claimed is:

1. A parametric interpolation filter for video signals comprising:
    a video signal input component for producing a video signal input in samples with a resolution uM×vN samples (where u and v are integers larger than 1) generated from a source original video signal that has a resolution of M×N samples in a reference frame, the video signal input being formatted by inserting zero-valued samples between samples of the original source video signal, wherein undesired frequency components are introduced; and
    an interpolation filter having a transfer function, the interpolation filter being coupled to the video signal input component to produce a video signal output in samples, wherein undesired frequency components are minimized, the interpolation filter being expressed by a filter function $h_f$ characterized by a set of parameters of the filter function and a plurality of parameter sets.

2. The parametric interpolation filter according to claim 1, said filter function $h_f$ being determined by a set of three frequency-limiting parameters and two cutoff frequencies, wherein filter coefficients are obtained by calculating function values $h_f(m, n)$, where m and n are indexes of M and N of the reference frame that determine a plurality of filter functions $h_f$ each of which is used for a different frame of the video signal input.

3. The parametric interpolation filter according to claim 2, for use in a video coding system in order to interpolate the M×N reference frame to the size uM ×vN for motion-compensated prediction, the values of the parameter sets being optimized such that for each part of the video signal input, energy of motion prediction error is reduced.

4. The parametric interpolation filter according to claim 2, for use in a video coding system in order to interpolate the M×N reference frame to the size uM×vN for motion-compensated prediction, the values of the parameter sets being quantized for transmission in a bitstream.

5. The parametric interpolation filter according to claim 1, said filter function $h_f$ having a diamond shaped frequency response having peaks along its vertical video frame axis and peaks along its horizontal video frame axis such that high frequency components are not filtered out.

6. The parametric interpolation filter according to claim 1, said function $h_f$ being the product of a first subfunction and a second subfunction, the first subfunction having a frequency spectrum desired by the video signal input and being of infinite size, the second subfunction being a window function used to clip the first subfunction to finite size.

7. The parametric interpolation filter according to claim 6, the frequency spectrum being diamond-shaped.

8. The parametric interpolation filter according to claim 6, said first subfunction, denoted as $h_d$, is of the form:

$$h_d(m, n) = \mathrm{Sinc}\left(\frac{\omega_1 m + \omega_2 n}{2}\right)\mathrm{Sinc}\left(\frac{\omega_1 m - \omega_2 n}{2}\right),$$
$$-\infty < m, n < \infty$$

where $\overline{\omega}_1$ and $\overline{\omega}_2$ are two parameters, representing the cut-off frequencies along the horizontal axis and along the vertical axis.

9. The parametric interpolation filter according to claim 8, said second subfunction, denoted as w, is of the form:

$$w(m, n) = \begin{cases} N[a + \mathrm{Sinc}(b|m| + c|n|)], & \text{if } \begin{aligned} -X/2 \le m \le X/2, \\ -Y/2 \le n \le Y/2 \end{aligned} \\ 0, & \text{otherwise} \end{cases}$$

where a, b, and c are parameters and N is not a parameter but is a factor used to adjust the filter gain of $h_d \times w$ and to limit filter gain equal to u×v.

10. A method for filtering video signals comprising:
    upsampling a video signal to horizontal resolution and vertical resolution of uM×vN samples (where u and v are integers larger than 1) generated from a source original video signal that has a resolution of M×N samples in a reference frame, the video signal input being formatted by inserting zero-valued samples between samples of the original source video signal, wherein undesired frequency components are introduced; and
    applying an interpolation filter having a transfer function coupled to the upsampled video signal to produce a video signal output in samples, wherein undesired frequency components are minimized, the interpolation filter being expressed by a filter function h.sub.f characterized by a set of parameters of the filter function and a plurality of parameter sets.

11. The method for interpolation filtering according to claim 10, said filter function $h_f$ being determined by a set of three frequency-limiting parameters and two cutoff frequencies, wherein filter coefficients are obtained by calculating function values $h_f(m,n)$, where m and n are indexes of M and N of the reference frame that determine a plurality of filter functions $h_f$, each of which is used for a different frame of the video signal input.

12. The method according to claim 11, for use in a video coding system in order to interpolate the M×N reference frame to the size uM×vN for motion-compensated prediction, the values of the parameter sets being optimized such that for each part of the video signal input, energy of motion prediction error is reduced.

13. The method according to claim 11, for use in a video coding system in order to interpolate the M×N reference frame to the size uM×vN for motion-compensated prediction, the values of the parameter sets being quantized for transmission in a bitstream.

14. The method according to claim 10, said filter function $h_f$ having a diamond-shaped frequency response having peaks along its vertical video frame axis and peaks along its horizontal video frame axis such that high frequency components are not filtered out.

15. The method according to claim 10, said function $h_f$ being the product of a first subfunction and a second subfunction, the first subfunction having a frequency spectrum desired by the video signal input and being of infinite size, the second subfunction being a window function used to clip the first subfunction to finite size.

16. The method according to claim 15, the frequency spectrum being diamond-shaped.

17. The method according to claim 15, said first subfunction, denoted as h.sub.d, is of the form:

$$h_d(m, n) = \text{Sinc}\left(\frac{\omega_1 m + \omega_2 n}{2}\right)\text{Sinc}\left(\frac{\omega_1 m - \omega_2 n}{2}\right),$$
$$-\infty < m, n < \infty$$

where $\bar{\omega}_1$ and $\bar{\omega}_2$ are two parameters, representing the cut-off frequencies along the horizontal axis and along the vertical axis.

18. The method r according to claim 8, said second subfunction, denoted as w, is of the form:

$$w(m, n) = \begin{cases} N[a + \text{Sinc}(b|m| + c|n|)], & \text{if } \begin{array}{l} -X/2 \le m \le X/2, \\ -Y/2 \le n \le Y/2 \end{array} \\ 0, & \text{otherwise} \end{cases}$$

where a, b, and c are parameters and N is not a parameter but is a factor used to adjust the filter gain of $h_d.t \times w$ and to limit filter gain equal to u×v.

19. A parametric interpolation filter for sampled video signals comprising: a video signal input component, the video signal input component having an enhancement stage to increase resolution of a motion vector and to interpolate a prediction error of a reference frame, wherein undesired frequency components are introduced; and
an interpolation filter having a transfer function coupled to the video signal input to produce a video signal output in form of a revised motion vector and revised prediction error for a subsequent frame, the filter for motion compensation prediction based on a five-parameter set of two cutoff frequencies and three filter function-limiting parameters to attain a diamond shaped frequency response having peaks along its vertical video frame axis and peaks along its horizontal video frame axis such that high frequency components are not filtered out.

* * * * *